United States Patent
Jundt et al.

(10) Patent No.: US 12,195,012 B2
(45) Date of Patent: Jan. 14, 2025

(54) SYSTEM AND METHOD FOR IDENTIFYING A CHANGE IN LOAD OF A COMMERCIAL VEHICLE

(71) Applicant: Knorr-Bremse Systeme Fuer Nutzfahrzeuge GmbH, Munich (DE)

(72) Inventors: Oliver Jundt, Hessigheim (DE); Gyoergy Juhasz, Budapest (HU); Ruediger Weis, Stuttgart (DE); Attila Skrabak, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 224 days.

(21) Appl. No.: 17/310,886

(22) PCT Filed: Feb. 12, 2020

(86) PCT No.: PCT/EP2020/053649
§ 371 (c)(1),
(2) Date: Aug. 27, 2021

(87) PCT Pub. No.: WO2020/182401
PCT Pub. Date: Sep. 17, 2020

(65) Prior Publication Data
US 2022/0041172 A1    Feb. 10, 2022

(30) Foreign Application Priority Data
Mar. 8, 2019    (DE) .................. 10 2019 105 927.5

(51) Int. Cl.
*B60W 40/13*    (2012.01)
*B60W 40/10*    (2012.01)
*B60W 50/14*    (2020.01)

(52) U.S. Cl.
CPC ............ *B60W 40/13* (2013.01); *B60W 40/10* (2013.01); *B60W 50/14* (2013.01); *B60W 2400/00* (2013.01); *B60Y 2200/147* (2013.01)

(58) Field of Classification Search
None
See application file for complete search history.

(56) References Cited

U.S. PATENT DOCUMENTS

| | | | |
|---|---|---|---|
| 2007/0017727 A1 | 1/2007 | Messih et al. | |
| 2010/0106360 A1 | 4/2010 | Lu et al. | |

(Continued)

FOREIGN PATENT DOCUMENTS

| | | |
|---|---|---|
| CN | 101918256 A | 12/2010 |
| CN | 102548823 A | 7/2012 |

(Continued)

OTHER PUBLICATIONS

International Search Report for PCT/EP2020/053649 Issued Apr. 28, 2020.

*Primary Examiner* — James M McPherson
*Assistant Examiner* — Bakari Underwood
(74) *Attorney, Agent, or Firm* — NORTON ROSE FULBRIGHT US LLP; Gerard A. Messina (57) ABSTRACT

A system for identifying a change in a load of a commercial vehicle, the commercial vehicle including an electronic stability program with at least one inertial sensor and a control unit for estimating a mass of the commercial vehicle and/or the load, including: a device for querying sensor data of the at least one inertial sensor; and an evaluation unit which is configured to identify the load change if the queried sensor data exceed a variation range, and inform the control unit of the identified load change to allow the load change (Continued)

to be taken into account in the estimation of the mass. Also described are a related commercial vehicle, method, and computer readable medium.

14 Claims, 5 Drawing Sheets

(56) References Cited

U.S. PATENT DOCUMENTS

| | | | |
|---|---|---|---|
| 2011/0010048 A1* | 1/2011 | Messih | B60W 40/13 |
| | | | 701/1 |
| 2011/0172877 A1 | 7/2011 | Dourra et al. | |
| 2017/0096127 A1* | 4/2017 | Zhang | B60T 8/17551 |
| 2018/0111619 A1* | 4/2018 | Hall | B60W 10/10 |
| 2018/0128672 A1* | 5/2018 | Park | F16H 59/52 |
| 2022/0155130 A1* | 5/2022 | Laine | G01G 19/021 |
| 2022/0219691 A1* | 7/2022 | Maleki | G06F 11/079 |

FOREIGN PATENT DOCUMENTS

| | | |
|---|---|---|
| CN | 104870273 A | 8/2015 |
| DE | 102007023069 A1 | 11/2008 |
| DE | 102011003298 A1 | 7/2012 |
| DE | 102017202178 A1 | 8/2018 |
| DE | 102017108034 A1 | 10/2018 |
| WO | 2008112667 A1 | 9/2008 |

\* cited by examiner

SYSTEM AND METHOD FOR IDENTIFYING A CHANGE IN LOAD OF A COMMERCIAL VEHICLE

FIELD OF THE INVENTION

The present invention relates to a system and a method for identifying a change in load of a commercial vehicle and in particular for detecting a change in load of commercial vehicles at a standstill.

BACKGROUND INFORMATION

Brake control systems and vehicle dynamics control systems need a highly accurate vehicle mass in order to be able to perform appropriate assistance functions correctly. Above all, in the case of commercial vehicles, the total mass varies considerably in some cases as a result of different loads, so that a repeated mass determination is carried out in order to be able to optimally support the assistance systems. Direct determination of mass is rarely possible, as this usually requires a weighbridge. Instead, a mass estimate is carried out, wherein the mass of the entire vehicle combination (towing vehicle and trailer) is estimated, or even just the mass of the load since the unladen mass is usually known.

The mass can be estimated, for example, by simultaneous capture of a drive torque (a torque acting on the wheels) and a resulting acceleration and/or their derivatives. Since the frictional forces are usually not precisely determinable, an exact determination of the mass from such dynamic quantities (i.e. without the use of a weighbridge) is usually only possible gradually by a large number of measurements. At a given time, therefore, a more or less accurate estimate of the mass is available.

This estimation can be carried out, for example, using the so-called RLS (Recursive-Least-Squares) algorithm or an RLS estimator, wherein the estimation is based on an excitation of the estimator by the corresponding input variables. In order to achieve the most reliable estimate of the mass, the estimate is improved over a longer period of time. In this way, sources of error with regard to the current estimate can be avoided or at least their effects can be reduced. Such sources of error result, for example, from a slope change during successive standstill periods of the commercial vehicle or from the unknown friction (on the road, the rotating parts of the vehicle, wind, etc.).

If the estimator is not informed that a change of load has taken place, the estimated value will not match the actual mass or only after a very long learning process. This can have significant consequences for the driving behavior of the vehicle. If, for example, downhill driving occurs after a change of load (for example, without the driver accelerating), a critical situation may arise because the required braking force has not yet been optimally calculated. The mass estimation will only gradually adapt to the change in load since the memory of the estimator still has measured values for the outdated load and the new input values have not yet been corrected. A driver may take this situation into account as a precaution, but for autonomous vehicles the outdated mass value could have highly adverse effects.

SUMMARY OF THE INVENTION

Therefore, there is a need for further possibilities for reliably identifying a load change of commercial vehicles in order to take this into account when estimating the mass and to speed up the estimation process.

At least some of the problems mentioned are solved by a system as described herein, a commercial vehicle as described herein and a method as described herein. The further descriptions herein define further advantageous embodiments of the subject matter of the main descriptions herein.

The present invention relates to a system for identifying a change in load of a commercial vehicle. The commercial vehicle comprises an electronic stability program (ESP) with at least one inertial sensor and a control unit for estimating a mass of the commercial vehicle and/or a load. The system comprises a device for querying sensor data of at least one inertial sensor and an evaluation unit configured to:
identify the load change if the queried sensor data exceed a variation range, and
inform the control unit of the identified load change in order to allow the load change to be taken into account in the estimation of the mass.

The inertial sensor can be a 3-axis sensor which can capture longitudinal acceleration, lateral acceleration and vertical acceleration. But it can also capture at least one rotation rate around one of the three spatial directions. However, individual inertial sensors can also be provided for individual acceleration or rotation rate components, so that the inertial sensor is one of them.

Optionally, the control unit is configured to carry out the mass estimation based on captured values such as a torque of a drive component, a resulting acceleration or speed or their (time) derivatives. The mass estimation can in particular involve a learning process which learns the mass through continuous capturing of the values. The evaluation unit may then be configured to cause the control unit to reset the previously conducted mass estimate or to re-weight the values captured before the load change after a load change has been identified in order to achieve a faster adaptation to the new mass.

The control unit may also be configured to indicate a change in the mass estimate of the evaluation unit. Optionally, the evaluation unit is then configured to determine and change the variation range based on continuous capturing of sensor data if the variation range is exceeded without a change in the mass estimate (for example if the control unit has not provided any corresponding information). Again, this can be a learning process which gradually leads to an improvement in the variation range used. This learning process can also learn the variation range for a particular mass or mass range. Here, for example, different variation ranges can belong to different mass ranges. The variation ranges may become larger or smaller or may even just be shifted to different acceleration values or rotation rate values.

Therefore, the evaluation unit may optionally be further configured to use a magnitude of the identified load change for a classification, wherein each class corresponds to a certain mass range in the variation range for loading the commercial vehicle. Thus, certain weight classes can be assigned to different variation ranges for loading. These ranges can be more or less roughly chosen. Thus, the ranges are formed by the tonne or with +/−1 tonne or +/−2 tonnes at certain masses.

The evaluation unit may optionally be further configured to use a plurality of predetermined variation ranges for the classification, each corresponding to a mass or a mass range. The predetermined variation ranges can be determined offline for example by simulations or tests and are stored in the evaluation unit.

Optionally, however, the evaluation unit can also be configured to indicate a load change regardless of its magnitude (without the use of ranges). If the mass determination is to be reset after a load change in principle, then this discrete signaling is sufficient.

Optionally, the evaluation unit is further configured to capture a frequency of variations in the sensor data, in particular for lateral accelerations (or rotation rates) and/or their derivates and to take these into account when determining the load change. In the case of a load change, there may be significant or characteristic variations in lateral acceleration (transverse to the longitudinal direction of the vehicle) or at least one of the rotation rates, which can be used efficiently for this purpose.

The commercial vehicle may have a trailer with a further inertial sensor (for example also part of an ESP), which provides trailer sensor data via a data connection. Optionally, the evaluation unit can then be further configured to evaluate the trailer sensor data and to confirm a load change or to handle it only on the basis of the trailer sensor data.

The commercial vehicle and/or a trailer connected to it may optionally have a height-adjustable axle whose height position can be determined by a sensor system. Optionally, the evaluation unit can then be further configured to take into account a change in the height position of the height-adjustable axle during a standstill or during slow driving to determine the load change. This additional sensor data can serve as confirmation that the load has indeed changed.

Optionally, the control unit is a part of the system as previously defined. For example, the control unit may be integrated in a component together with the evaluation unit or may also be in the form of a separate component. Thus, the control unit and/or the system may be integrated in an electronic brake system (EBS). In particular, the functions may also be implemented in software (for example as software modules).

Optionally, the evaluation unit may be further configured to communicate the load change to a driver of the commercial vehicle. The driver may then, for example, give a confirmation of the load change or may deny this. Depending on this, the learning process of the mass determination or the learning process of the (tolerable) variation range can be reset or continued.

Exemplary embodiments also relate to a commercial vehicle with a system as described above.

Further exemplary embodiments relate to a method for identifying a change in load of a commercial vehicle, wherein the commercial vehicle comprises an electronic stability program (ESP) with at least one inertial sensor and a control unit for estimating a mass of the commercial vehicle and/or a load. The method includes the following steps:
- querying sensor data of the at least one inertial sensor;
- identifying the load change when the queried sensor data exceed a variation range, and
- providing confirmation of the identified load change for the control unit so that it takes the load change into account in estimating the mass.

The functions of the system described above can be implemented as further optional steps of this method.

This method or at least parts thereof may also be implemented or stored in the form of instructions in software or on a computer program product, wherein stored instructions are able to perform the steps according to the method when the method runs on a processor. Therefore, the present invention also relates to a computer program product with software code stored on it (software instructions), which is configured to execute one of the methods described above when the software code is executed by a processing unit. The processing unit may be any form of computer or control unit which has a corresponding microprocessor which can execute a software code.

Exemplary embodiments of the present invention solve the aforementioned technical problem in that limit values for defined variation ranges of acceleration values or of rotation rates are monitored and readjusted if the mass has not changed in the meantime. If the (tolerable) variation ranges have been learned in this way, detection of a load change can be carried out quickly and efficiently. This information is used by the exemplary embodiments to reset the process of mass determination or at least to adapt it accordingly.

In the case of vehicle combinations with trailers, the direct detection of a load change can also be carried out by evaluating the information of the trailer detection. In addition, for vehicles or vehicle combinations that have axle load sensors (in the towing vehicle and/or trailer), direct detection of the load change can also be carried out. However, since this procedure is not always possible or provides only inadequate results, the exemplary embodiments improve the reliability of the mass determination.

The exemplary embodiments of the present invention will be better understood from the following detailed description and the enclosed drawings of the different exemplary embodiments, which, however, should not be understood as restricting the disclosure to the specific embodiments, but which only serve as an explanation and for understanding.

DETAILED DESCRIPTION

Figure 1:
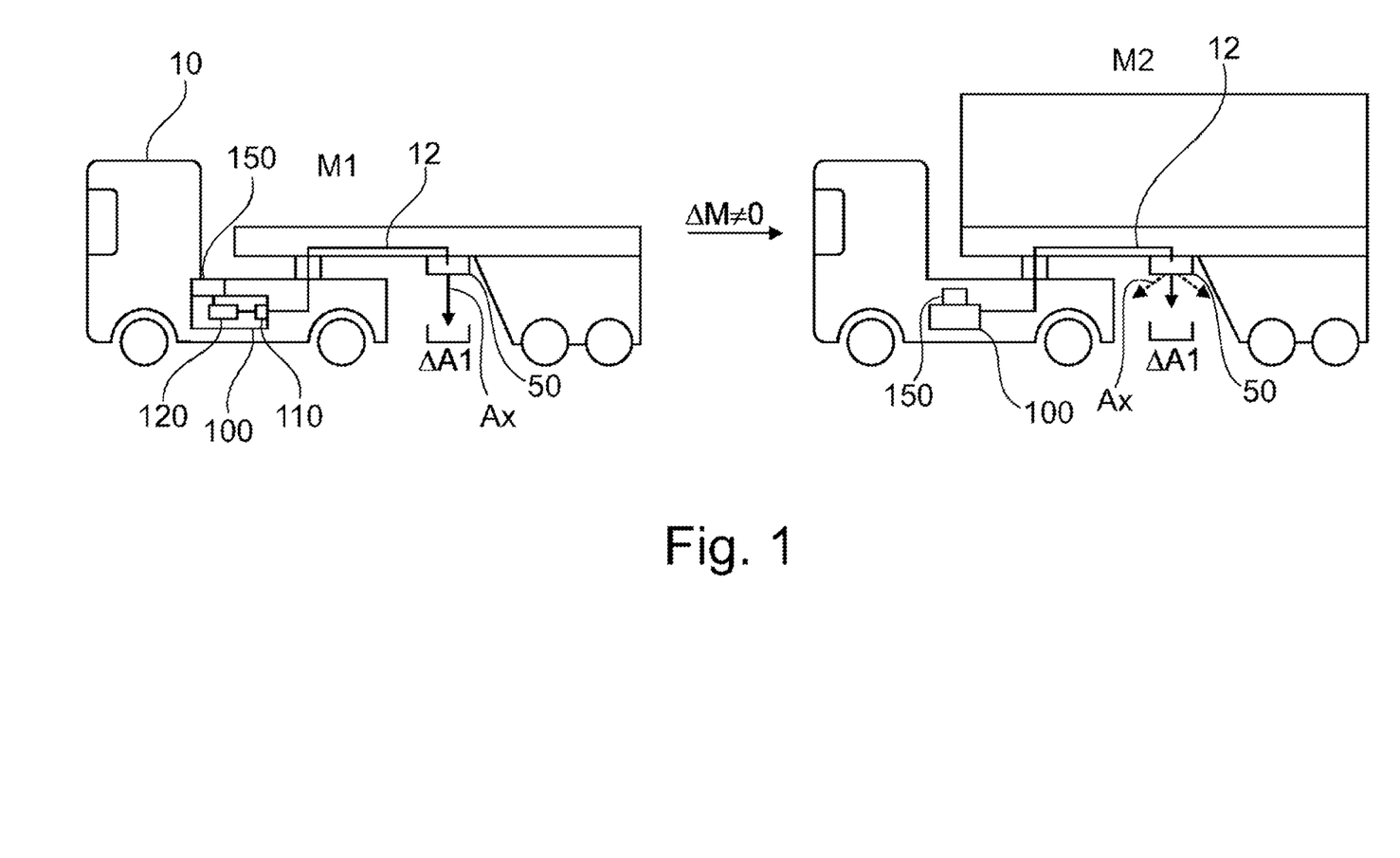
FIG. 1 shows an exemplary embodiment for the system for detecting a load change of a commercial vehicle.

FIG. 1 shows an exemplary embodiment for the system 100 for identifying a load change $\Delta M$ of a commercial vehicle 10, wherein the commercial vehicle 10 has an electronic stability program (ESP) with at least one inertial sensor 50. In addition, the commercial vehicle 10 comprises a control unit 150 which is configured to estimate a mass M1, M2 of the commercial vehicle and/or a mass M1, M2 of a load of the commercial vehicle. The mass M1, M2 may refer to the total mass of the commercial vehicle or only to the load (total mass less the unladen mass). The system 100 comprises a device 110 for querying sensor data of at least one inertial sensor 50. In addition, the system comprises an evaluation unit 120 which is configured to determine the load change $\Delta M$ if the sensor data queried exceed a maximum variation range $\Delta A$.

The control unit 150 is informed about a detected load change $\Delta M$, for example via a corresponding data connection 12, so that the control unit 150 can take into account the load change $\Delta M$ when estimating the mass M1, M2. The control unit 150 and the evaluation unit 120 can be different components of the vehicle 10. According to further exemplary embodiments, however, it is also possible that the control unit 150 and the evaluation unit 120 are formed within a single vehicle component. Thus, they can be implemented in the form of software in a control unit.

The inertial sensor 50 in the exemplary ESP unit may be, for example, a three-axis inertial sensor, which, for example, independently captures three different acceleration values: Ax (along the longitudinal direction of the vehicle), Ay (along the transverse direction of the vehicle), Az (along the vertical direction) or corresponding rotation rates around the corresponding spatial directions. It is also possible that not only one inertial sensor 50 is present, but a number of inertial sensors are present in the vehicle 10 to independently capture the acceleration values and/or rotation rates along the x-axis (Ax) or the y-axis (Ay) or the vertical z-axis (Az) or rotation rates around these axes. The x-axis, for example, is the axis parallel to a normal direction of travel of the vehicle, while the y-axis is perpendicular to it in the horizontal plane.

However, the invention should not be limited to certain inertial sensors 50 as long as at least one acceleration value and/or one rotation rate A can be measured, which changes when a load change ΔM occurs. In the following, multiple acceleration values or rotation rate values A are often mentioned, although the invention is not to be limited to this.

As an example, FIG. 1 shows on the left the case in which the commercial vehicle 10 has a trailer on which no container has yet been placed and the commercial vehicle has the mass M1. On the right, the case is shown after loading the container on, so that the mass M2 (>M1) has increased. The loading itself is generally associated with vibrations or deflections in the acceleration values/rotation rates A. In addition, the resting value of the acceleration values/rotation rates A may also be shifted after loading since the center of mass of the load will not be exactly central under real conditions and the acceleration due to gravity is always acting.

The acceleration values or rotation rates A may be measured in an idle state of the vehicle 10 or are continuously monitored in order to be able to detect changes immediately. The idle state (standstill) of the vehicle 10 can be determined, for example, by control electronics of the vehicle 10. It is understood that during the movement of the vehicle 10 a large number of acceleration values/rotation rates A occur, which could falsify the determination of the load change ΔM, so that the measurement of the acceleration values/rotation rates A may be carried out at a standstill.

Figure 2:
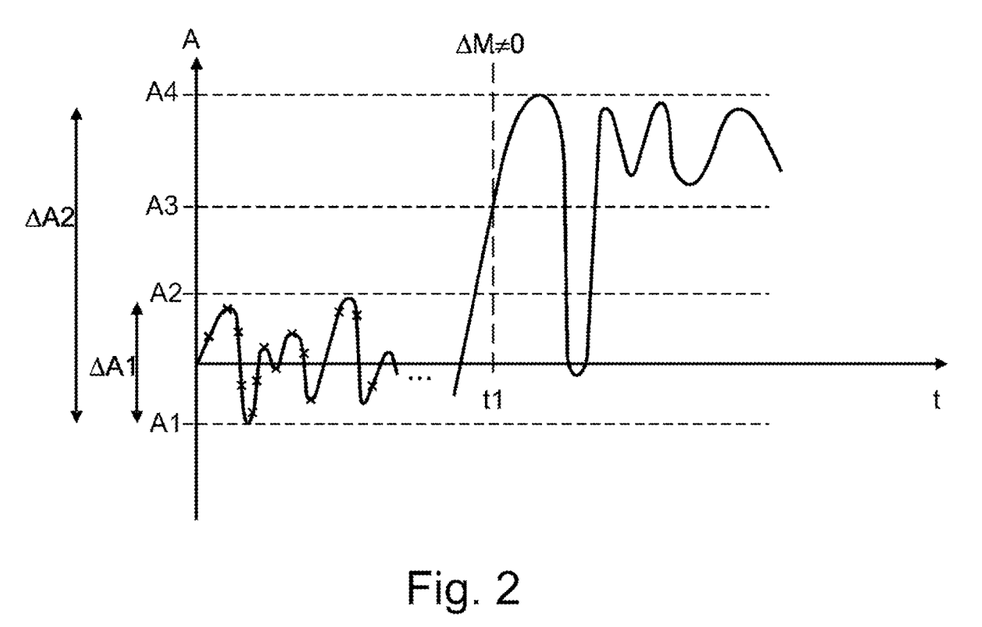
FIG. 2 illustrates the detection of a load change based on a variation range of the captured acceleration value according to exemplary embodiments.

FIG. 2 illustrates the detection of a load change ΔM based on a variation range ΔA1, ΔA2 of the captured acceleration value A according to the exemplary embodiments. Although accelerations are captured here as an example, it goes without saying that rotation rates can also be captured and evaluated. FIG. 2 shows acceleration values A as a function of time t, as they are captured by the inertial sensor 50 when the vehicle 10 is at a standstill. It can be discrete or continuous capturing of acceleration values A, wherein measurements during successive standstill periods can also be taken into account.

The captured acceleration variations initially vary between a minimum value A1 and a maximum value A2 with a tolerable variation range ΔA1. Such variations can have a variety of causes. For example, a passing vehicle, wind or other sources of vibration can be detected by the inertial sensor 50. The individual values (see crosses) which have been combined into a curve represent different measurements at different points in time t or include at least piecemeal periods of time recorded with the vehicle 10 at a standstill.

At a time t1 there is a sudden jump of the acceleration value A and at times t>t1 the acceleration values A vary between a maximum value A4 (>A2) and the minimum value A1 or a higher value A3. For times t>t1, multiple values for the acceleration values can be measured, which now belong to a second load state (for example for the mass M2 from FIG. 1). The acceleration values A are measured again in an idle state of the vehicle 10.

According to exemplary embodiments, exceeding the variation range ΔA1 is an indication of a load change ΔM. The evaluation unit 120 will therefore inform the control unit 150 that there has been a (potential) mass change ΔM. The control unit 150 can then use this information to determine the mass again or to interrupt the previous learning process and start again (e.g. by resetting the memory).

Exceeding the variation range ΔA1 could also be an outlier which does not correspond to a load change ΔM. To take this into account, the consequential values for acceleration A can be taken into account. At these values it can be determined how likely a load change ΔM was. If the new variations, as shown in FIG. 2A, are adjusted to a larger or shifted variation range ΔA2 (for example between A4 and A3) or multiple strong deflections have been detected, then it is most likely a load change ΔM. However, if only a few measurements are outside the old variation range ΔA1 and do not significantly exceed it, it may only be a statistical outlier value, which is most likely not associated with a load change. From the consequential behavior of the curve A=A(t), a correlation can thus be determined as to how likely it is that a load change ΔM has taken place.

This probability can be used to weight the previous values differently during the mass determination (in the learning process) in the control unit 150. If the probability is close to 1 (as in FIG. 2A), then the memory can be erased in the learning process of the mass determination. Otherwise, these values can be weighted less strongly to take into account the uncertainty of what really happened at time t1.

In principle, a certain variation range ΔA can be defined for each mass. Therefore, the variation range ΔA can be defined as a continuous function of the mass M. But then it is often difficult to treat outliers correctly because the probability of whether it is an outlier or not is then difficult to decide. In addition, minor mass changes (for example ΔA in a range of 0.2 m/s$^2$) can be tolerable and do not indicate a load change ΔM. It is therefore advantageous to divide the potential mass changes ΔM into classes, so that only when a certain minimum mass change (for example of 1 tonne or 4 tonnes) is exceeded is a load change detected and forwarded accordingly.

Advantageous exemplary embodiments therefore use a classification of the load of the commercial vehicle 10. The load can be divided into different load classes. Such load classes may include, for example, a load from 0 to 3 tonnes, from 3 to 6 tonnes, from 6 to 9 tonnes, etc. or other ranges (for example in increments of 2 tonnes or 4 tonnes or 5 tonnes), so that in the determination of the variation range ΔA a separate variation range is defined only for each class, the violation of which constitutes an indication of a load change ΔM. Only when these limits are more or less permanently violated is a more or less strong adjustment of the mass estimate carried out (for example different weighting of the earlier measurement results).

If there is a complete reset of the mass estimate in the control unit 150, the mass determination is then carried out again, with new valid values for the vehicle 10 after the load change.

According to further exemplary embodiments, a potential load change $\Delta M$ can also be output to the driver, who can then confirm it or not. In this case, the mass estimate in the control unit 150 can be reset and the memory of the learning process can be erased or at least weighted differently. If no confirmation is given, the learning process of the mass M and/or the variation range $\Delta A$ can be continued.

Figure 3:
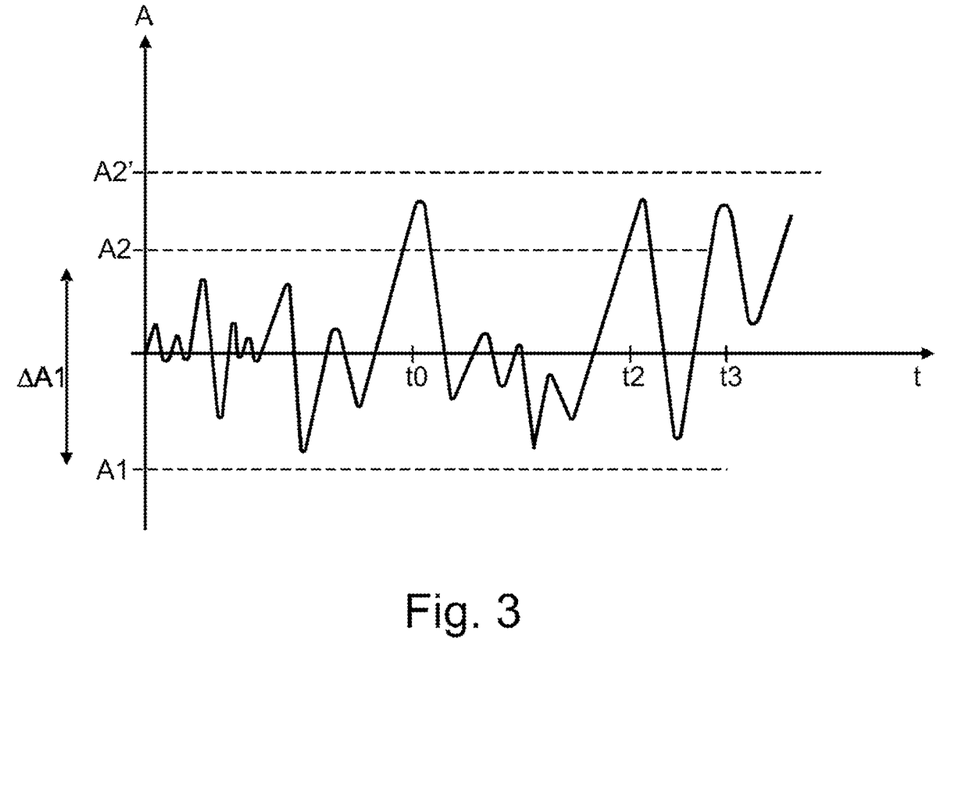
FIG. 3 illustrates a possible learning process for determining the tolerable maximum variation range according to further exemplary embodiments.

FIG. 3 illustrates a possible learning process for determining the tolerable variation range $\Delta A$, in the event of the violation of which a load change is displayed and, for example, a corresponding signal is sent to the control unit 150. According to exemplary embodiments, the variation range $\Delta A$ is not fixed, but is optimized in a learning process. However, an initial value can be specified. The system 100 can thus determine (learn) or improve the tolerable variation range $\Delta A$ itself.

The inertial sensor 50 records a variety of acceleration values/rotation rates A in the idle state, which have a certain variation range $\Delta A1$, for example between a lower value A1 and an upper value A2 (for example, for the x component of the acceleration A). As long as the load state does not change, the variation range will have a value $\Delta A1$, which is typical for the vehicle 10, the ESP unit used, the place of use of the vehicle, etc. For this purpose, a presetting can first be used, which according to the exemplary embodiments can be changed by a learning process or adapted to the specific conditions (in particular to the vehicle). However, it is also possible that the control unit 150 transmits a current load state or a determined change in the mass M to the evaluation unit 120.

At the time t0 an exemplary deflection occurs for the acceleration/rotation rate A, which is outside this range $\Delta A1$. Subsequently, multiple acceleration values/rotation rates are measured at the times t2, t3, which also have a greater value than the previously measured variation range $\Delta A1$. If such an increased variation range $\Delta A1$ does not correlate with a load change, these values are used to correct the permissible variation range $\Delta A1$ in an idle state for the given load. Apart from a specific notification by the control unit 150, such a load change $\Delta M$ can be assumed if the acceleration values/rotation rates A are significantly above the old limit value A2 (for example exceed this by more than 100%).

The evaluation unit 150 can send a corresponding signal to the control unit 150 in response to the exceedance at time t0, wherein the control unit 150 checks in a subsequent mass determination whether there have been significant changes to the previously measured magnitudes for the mass M. If not, the increased variation at time to can be used to correct the variation range $\Delta A1$. However, if the control unit 150 also detects a significantly increased mass at the subsequent time, the increased acceleration value/the increased rotation rate A at time t0 is probably due to a load change $\Delta M$. Thus, a learning process for the determination of an optimal variation range $\Delta A$ of the acceleration value/the rotation rate A in the idle state of the vehicle is set in motion, which may be carried out, for example, for a certain time or permanently, in order to optimize the tolerable variation range $\Delta A$ of the captured acceleration value (or the captured rotation rate) A.

According to further exemplary embodiments, the decision as to whether there was a change in mass $\Delta M$ at the time t0 can also be determined on the basis of lift axle positions. In commercial vehicles, for example, the axles can often be moved vertically, for example to make it easier to couple a trailer. This vertical position can be measured, for which appropriate sensors are available. If there has been a load change $\Delta M$, such a load change $\Delta M$ can also manifest itself in a change in position of such a moving axle. These sensors can communicate such a vertical change in position, so that according to the exemplary embodiments this information is used to indicate or refute a mass change $\Delta M$ at time to.

With further exemplary embodiments, it is also possible to directly measure the vertical acceleration Az (or the corresponding rotation rate) (for example, using a separate sensor or a 3-axis inertial sensor). If a minimum deflection is detected for this value, this is a clear indication of a load change $\Delta M$, which according to the exemplary embodiments is used to accelerate the mass determination.

Figure 4:
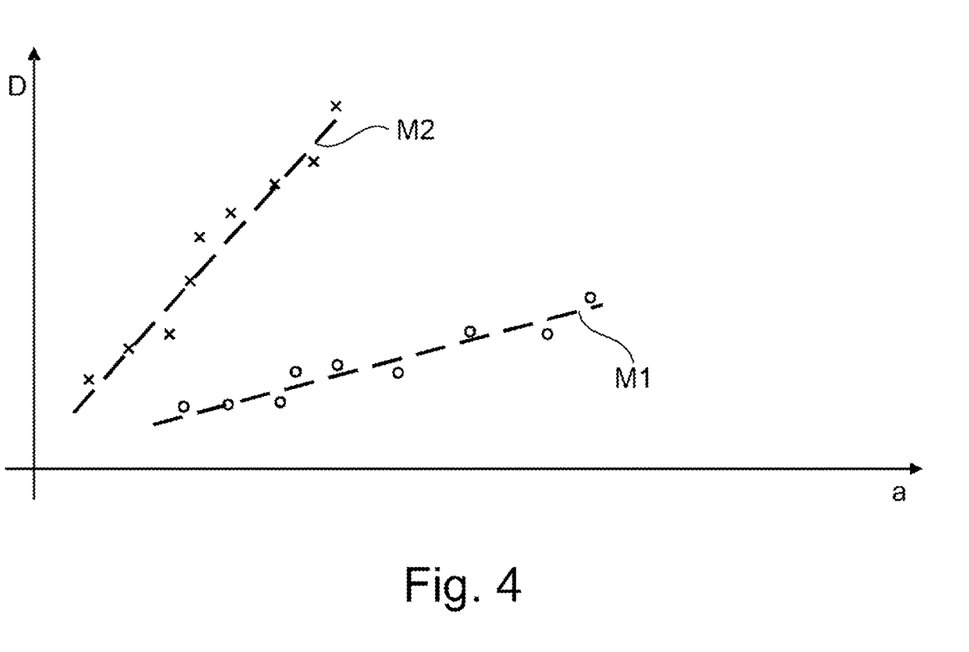
FIG. 4 shows an exemplary embodiment for determining the mass M of the vehicle or its load.

FIG. 4 shows an exemplary embodiment for determining the mass M of the vehicle 10 or its load. For this purpose, a torque D of a vehicle component (for example a driven wheel) can be measured and related to an acceleration a which the vehicle experiences in response to this torque. It is understood that according to the laws of physics, an acting torque D exerts a force on the vehicle 10 and thus leads to an acceleration a.

In the ideal case, there is a linear relationship between the two quantities, wherein the mass M of the commercial vehicle 10 corresponds to the gradient. However, under real conditions, strictly speaking such a linear relationship does not occur, since friction effects occur, which are usually a function of the speed of the vehicle 10. These are for example frictional forces on the road or frictional forces of the rotating components and are a function of the speed. Therefore, the measured values of the torque D and the resulting acceleration a will be scattered around the linear relationship. From a large number of measurements, however, it is possible to determine or learn the value of the mass M.

This mass estimation may be integrated in the electronic brake system EBS and is made available to the integrated brake system functions and the ESP (as an estimated vehicle combination mass).

FIG. 4 shows by way of example how a mass M1 correlates with the measurements marked with circles. A second mass value M2 (>M1) correlates accordingly with the measured values shown with the crosses. In order to determine the mass, a large number of measurements are required, wherein the mass M can be determined or improved more or less accurately by a statistical analysis. This process can be carried out continuously, for example during each acceleration of the commercial vehicle 10.

Since a load change $\Delta M$ can potentially always occur, it is advantageous that older measured values are weighted correspondingly weaker or not taken into account at all. As a result, it is achieved that the system learns the new mass M2 over time after a load change $\Delta M$ and can determine the correct mass according to this learning process. Specifically, a so-called RLS algorithm can be used for this learning process, for example, in which a so-called PT1 filter can also be used. In general, however, mass determination based on these algorithms takes a very long time. Certainly, this process can take a very long time. It can lead to the significant safety risk mentioned at the beginning.

An advantage of the exemplary embodiments is precisely that the load change $\Delta M$ can be detected quickly and independently of other sensors and is used to carry out the determination of the mass M faster. Thus, a corresponding history can be erased or weighted differently during the mass determination if, for example, a change in mass $\Delta M$ was detected at time t0 or at time t3 and the control unit 150 was caused to take this into account. The mass can then be determined again. By eliminating obviously incorrect measurement values (based on an outdated mass), an accurate result can be achieved more quickly, which is a great advantage of the exemplary embodiments.

Further exemplary embodiments also relate to a method for identifying a load change. This method may also be computer-implemented, i.e. it may be implemented by instructions stored on a memory medium and capable of performing the steps of the method when running on a processor. The instructions typically include one or more instructions which may be stored in different ways on different media in or peripheral to a control unit (with a processor) which, when read and executed by the control unit, cause the control unit to perform functions, functionalities and operations which are necessary to perform a method according to the present invention.

Figure 5:
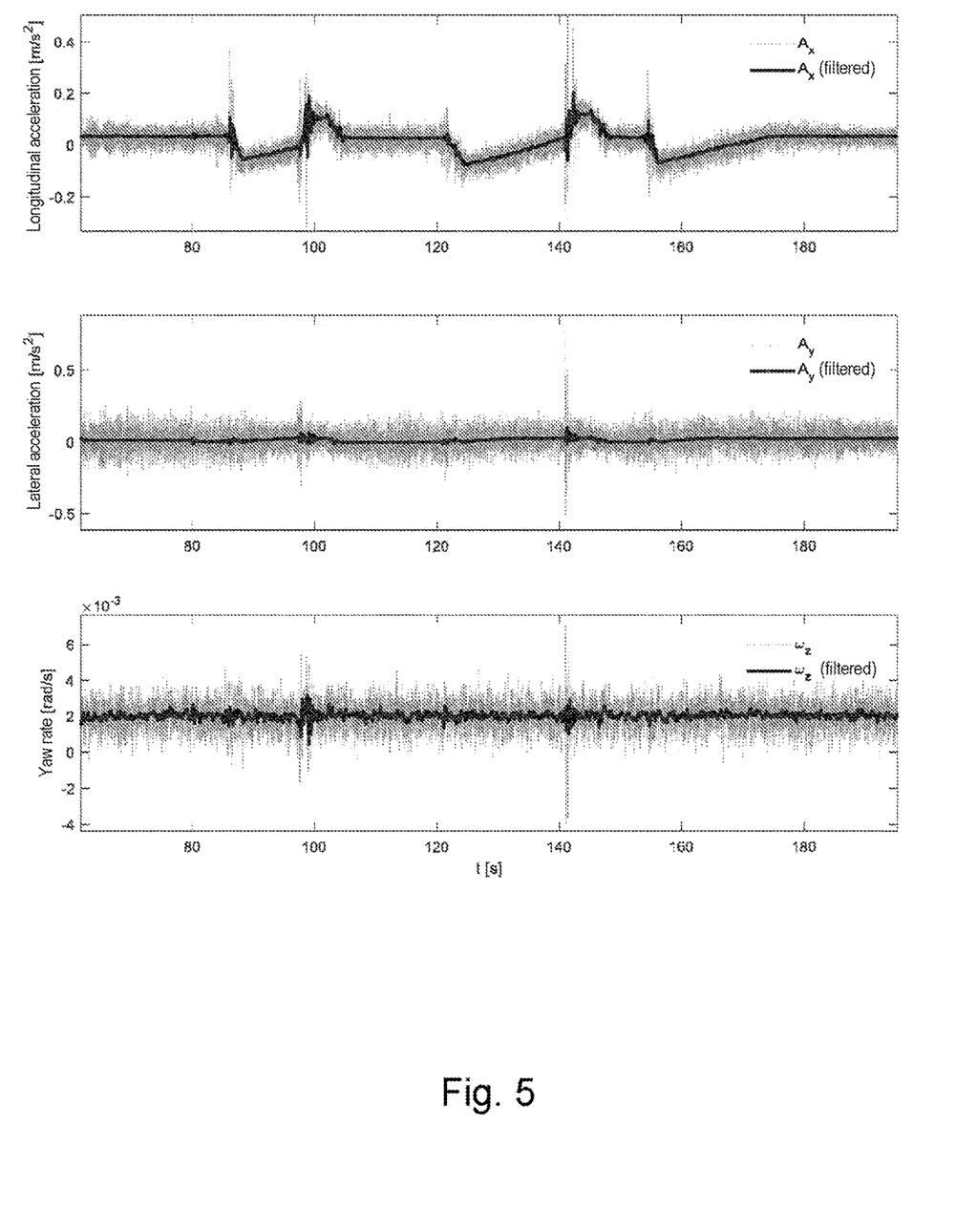
FIG. 5 shows exemplary measurement results for variations of sensor data of the inertial sensor and their changes due to a load change.

FIG. 5 shows exemplary measurement results, which illustrate a first load change at a time of about 100 s and a second load change at a time of about 140 s. These load changes are clearly recognizable in the vibration pattern both in the longitudinal acceleration Ax (top) and in the lateral acceleration Ay (center) as well as in the rotation rate (bottom). In order to be able to better detect the load change, filtering is optionally carried out (see filtered measured variables), which significantly reduces the variation range and can provide better detection signals. Thus, in the case of the exemplary load changes, the variation range of the filtered quantities increases significantly (for example more than doubling), while it is otherwise relatively small.

The ramp-shaped increase of the longitudinal accelerations Ax between the load changes is a consequence of the readjustment of the air suspension.

Other advantageous aspects can be summarized as follows:

A standstill of a vehicle can be reliably detected (for example by revolution rate sensors). Today's commercial vehicles (towing vehicles) usually have ESP sensors for capturing longitudinal acceleration and lateral acceleration as well as the rotation rate in the towing vehicle. According to the exemplary embodiments, at a standstill at least the lateral acceleration and/or the longitudinal acceleration or their derivatives (including of higher order) are observed/captured. A load change $\Delta M$ will be indicated in these signals, for example by vibration when a container is loaded or by an offset (especially) in the longitudinal acceleration due to a changed angle of inclination. Fixed values may be specified for the change in the acceleration signal(s) or the variables derived therefrom with which a load change $\Delta M$ is identified.

With further embodiments, these limit values are learned. For this purpose, the maximum is observed during standstill periods. After a successful mass estimate (after the standstill), it is determined with high quality whether the maximum must be assigned to a load change $\Delta M$ or to an unchanged load. This is particularly advantageous if different types of vehicles behave differently. In this case, in particular the type of suspension (air or steel suspension) has an influence on the change in the angle of inclination due to the load change $\Delta M$.

With further embodiments, the lateral acceleration and/or longitudinal acceleration signal, which is captured in the trailer and transmitted to the towing vehicle via a trailer CAN connection according to ISO11992, is determined in the same way (additionally or exclusively) as in the towing vehicle.

With further embodiments, no digital signal is produced in the event of a load change $\Delta M$ (i.e. yes/no) but the magnitude of the load change $\Delta M$ is estimated. This is compared by comparing the maximum with a limit which is set or learned offline.

With further embodiments, not only the maximum, but also the frequency of the sensor data A (lateral acceleration(s) and/or longitudinal acceleration(s) and/or vertical acceleration(s) and/or rotation rate(s)) or their derivatives are used as a decision criterion.

With further embodiments, in the case of vehicles 10 (towing vehicle and/or trailer) with at least one liftable axle, a change in the lift axle position during a standstill or at slow speed is used as a decision criterion for a load change $\Delta M$. The lift axle position can be determined, for example by a CAN message or, if appropriate, concluded from its revolution rate during slow driving in the case of any existing wheel revolution rate sensors.

With further embodiments, only load changes $\Delta M$ which exceed a certain level are detected. This is because small load changes $\Delta M$ have no significant influence on the brake control system and the vehicle dynamics control system.

The features of the invention disclosed in the description, the claims and the figures may be essential for the realization of the invention, both individually and in any combination.

REFERENCE CHARACTER LIST

10 commercial vehicle
50 inertial sensor
100 system for identifying the change in load
110 device for querying sensor data
120 evaluation unit
150 control unit
$\Delta M$ load change, change in load
A sensor data of the inertial sensor
$\Delta A$ maximum variation range of the inertial sensor data (for example acceleration(s) or rotation rate(s))
A vehicle acceleration
D torque

The invention claimed is:

1. A system for identifying a change in a load of a commercial vehicle, the commercial vehicle including an electronic stability unit having at least one inertial sensor and a control unit for estimating a mass of the commercial vehicle and/or the load, which results in an estimated mass, comprising:
    a device for querying sensor data of the at least one inertial sensor; and
    an evaluation unit to identify the load change when the queried sensor data exceed a maximum acceleration variation range, and inform the control unit of the identified load change to allow the load change to be taken into account in the estimating of the mass;
    wherein potential mass changes are grouped into a plurality of classes, wherein a corresponding acceleration variation range is defined for each of the classes, so that a load change is detected and forwarded only when the corresponding acceleration variation range is exceeded for a corresponding one of the classes.

2. The system of claim 1, wherein the control unit is configured to carry out the estimated mass based on captured values, including at least one of a torque of a drive component, a resulting acceleration or speed, or their changes with time, and wherein the estimated mass includes a learning process which learns the mass by continuous capturing of the values, and wherein the evaluation unit is configured to cause the control unit to reset the previously carried out estimated mass or to weight the values captured before the load change differently after the identification of a load change.

3. The system of claim 1, wherein the control unit is configured to communicate a change in the estimated mass to the evaluation unit, and wherein the evaluation unit is configured to determine and change the variation range based on continuous capturing of sensor data when the variation range is exceeded without a change in the estimated mass.

4. The system of claim 1, wherein the evaluation unit is configured to indicate a load change regardless of its magnitude.

5. The system of claim 1, wherein the evaluation unit is configured to use a magnitude of the detected load change for a classification, and wherein each class corresponds to a certain mass range for the load of the commercial vehicle.

6. The system of claim 5, wherein the evaluation unit is configured to use for the classification a large number of learned or predetermined variation ranges, each corresponding to a mass range.

7. The system of claim 1, wherein the evaluation unit is configured to capture a frequency of variations in the sensor data, for lateral accelerations or rotation rates, and/or their derivate and to take these into account when identifying the load change.

8. The system of claim 1, wherein the commercial vehicle includes a trailer which has another inertial sensor and provides trailer sensor data via a data connection, and wherein the evaluation unit is configured to evaluate the trailer sensor data to identify or confirm the load change.

9. The system of claim 1, wherein the commercial vehicle and/or a connected trailer has a height-adjustable axle, the height position of which can be determined by a sensor system, and wherein the evaluation unit is configured to take into account a change in the height of the height-adjustable axle during a standstill or during slow travel to identify the load change.

10. The system of claim 1, wherein the control unit is a component of the system and is integrated in a component together with the evaluation unit or is a separate component.

11. The system of claim 1, wherein the evaluation unit is configured to communicate the load change to a driver of the commercial vehicle.

12. A commercial vehicle, comprising:
an electronic stability unit having at least one inertial sensor;
a control unit for estimating a mass of the commercial vehicle and/or a load; and
a system for identifying a change in the load of the commercial vehicle, including:
  a device for querying sensor data of the at least one inertial sensor; and
  an evaluation unit to identify the load change when the queried sensor data exceed a maximum acceleration variation range, and inform the control unit of the identified load change to allow the load change to be taken into account in the estimation of the mass;
wherein potential mass changes are grouped into a plurality of classes, wherein a corresponding acceleration variation range is defined for each of the classes, so that a load change is detected and forwarded only when the corresponding acceleration variation range is exceeded for a corresponding one of the classes.

13. A method for identifying a change in load of a commercial vehicle, the commercial vehicle including an electronic stability unit having at least one inertial sensor and a control unit for estimating a mass of the commercial vehicle and/or a load, the method comprising:
querying sensor data of the at least one inertial sensor;
identifying the load change when the queried sensor data exceed a maximum acceleration variation range, and
providing confirmation of the identified load change for the control unit so that it takes the load change into account when estimating the mass;
wherein potential mass changes are grouped into a plurality of classes, wherein a corresponding acceleration variation range is defined for each of the classes, so that a load change is detected and forwarded only when the corresponding acceleration variation range is exceeded for a corresponding one of the classes.

14. A non-transitory computer readable medium having a computer program, which is executable by a processor or data processing unit, comprising:
a program code arrangement having program code for identifying a change in load of a commercial vehicle, the commercial vehicle including an electronic stability unit having at least one inertial sensor and a control unit for estimating a mass of the commercial vehicle and/or a load, by performing the following:
querying sensor data of the at least one inertial sensor;
identifying the load change when the queried sensor data exceed a maximum acceleration variation range, and
providing confirmation of the identified load change for the control unit so that it takes the load change into account when estimating the mass;
wherein potential mass changes are grouped into a plurality of classes, wherein a corresponding acceleration variation range is defined for each of the classes, so that a load change is detected and forwarded only when the corresponding acceleration variation range is exceeded for a corresponding one of the classes.

* * * * *